US005687678A

United States Patent [19]
Suchomel et al.

[11] Patent Number: 5,687,678
[45] Date of Patent: Nov. 18, 1997

[54] HIGH EFFICIENCY COMMERCIAL WATER HEATER

[75] Inventors: Frank H. Suchomel, Dallas; John B. Hankins, Waxahachie, both of Tex.

[73] Assignee: Weben-Jarco, Inc., Dallas, Tex.

[21] Appl. No.: 378,784

[22] Filed: Jan. 26, 1995

[51] Int. Cl.⁶ .................................................. F22B 21/26
[52] U.S. Cl. .................. 122/250 R; 122/249; 122/247; 122/248
[58] Field of Search ............................. 122/13.1, 18, 32, 122/33, 34, 247, 248, 249, 250 R

[56] References Cited

U.S. PATENT DOCUMENTS

| | | | |
|---|---|---|---|
| 4,029,056 | 6/1977 | Wanson | 122/34 |
| 4,261,299 | 4/1981 | Marran | 122/134 |
| 4,793,800 | 12/1988 | Vallett et al. | 431/328 |
| 4,901,677 | 2/1990 | Demetri | 122/235 F |
| 4,938,204 | 7/1990 | Adams | 126/360 R |
| 5,311,843 | 5/1994 | Stuart | 122/248 |

OTHER PUBLICATIONS

Brochure—Form No. AOSC60860 (©1992 A.O. Smith Corporation), "A.O. Smith Legend 2000 Burkay—Designed to take ultra high efficiency gas boiler performance into the 21st century" (5 pg.).
Brochure—#PV488 Feb. 1991 (Commercial Water Heating Systems, Fort Worth, Texas), "The world's most efficient gas-fired water heater. Turbopower 99 (99% Thermal Efficiency), US Pat #4,938,204" (2 pg.).
Article—"A Variety of Design Factors Govern Water Heater Choices", *Consulting/Specifying Engineer,* Jan. 1991 (4 pg.).
Brochure—Bulletin TB-1 (P-K Thermific™ Gas-Fired Boiler), "A New Standard of Efficiency in Non-Condensing Boilers"—Patterson-Kelley Co., East Stroudsburg, PA 18301 (8 pg.).
Advertisement—"Pursuing an Engineered Products Concept," Appliance Engineering/Design section–*Appliance* (Jul. 1986) (2 pg.).

Brochure—"Heatmaker 9600 with Optional Storage Tank"–Heatmaker 9600 Hot Water Generator (Trianco–Heatmaker, Inc., 111 York Avenue, Randolph, MA 02368) (4 pg.).
Annual Report (Jan. 1983–Dec. 1983), Gas Research Institute—"High-Efficiency Commercial Water Heater Development," prepared by E. P. Demetri, et al., Advanced Mechanical Technology, Inc., 141 California Street, Newton, MA 02158 (4 pg.).
Brochure—"System 2000 from Energy Kinetics . . . " (Energy Kinetics, Inc.), US Pat No. 4,261,299 and patents pending (1 pg.).
Final Report (Aug. 1989–Aug. 1990), Gas Research Institute—GRI Contract No. 5089-260-1827, "Evaluation of Alternative Materials for Condensing Heat Exchangers," prepared by A. K. Agrawal, et al., Battelle, Columbus Div., 505 King Ave., Columbus Division, 505 King Avenue, Columbus, Ohio 43201-2693 (50 pg.).
Final Report—1992, International Copper Association, Ltd.—Project No. 451 (Contractor Report), "Test of Protective Measures for Copper Heat Exchangers in the Condensing Flue Gas Environment of High Efficiency Heating Equipment," prepared by Yankee Scientific, Inc., 93 West St., Medfield MA (Principal Investor: Eric C. Guyer ) (55 pg.).

(List continued on next page.)

*Primary Examiner*—Henry A. Bennett
*Assistant Examiner*—Gregory A. Wilson
*Attorney, Agent, or Firm*—John W. Montgomery

[57] ABSTRACT

A commercial water heater apparatus, including a housing, a radial-fired burner within the housing, a single continuous, multiple loop, finned coil tubing heat exchanger for circulating water around the burner, having at least a first set of inner coils forming a coil trough therebetween and a second set of outer coils nested within the coil trough formed by the inner set of coils, the outer set of coils forming a second coil trough around the exterior thereof, and a coil baffle interposed in the second exterior trough for deflecting heat adjacent to the second set of coils.

15 Claims, 6 Drawing Sheets

OTHER PUBLICATIONS

Brochure—"Heatmaker 9600 Hot Water Generator–Here's Where. Here's Why" (Trianco–Heatmaker, Inc., 111 York Avenue, Randolph, MA 02368) (6 pg.).

Brochure—"Epoxy Powder Coatings"–Fuller–O'Brien: Powder Coatings Technical Data (The O'Brien Corporation, Fuller–O'Brien Powder Coatings Division, Houston, Texas 77021) (2 pg.).

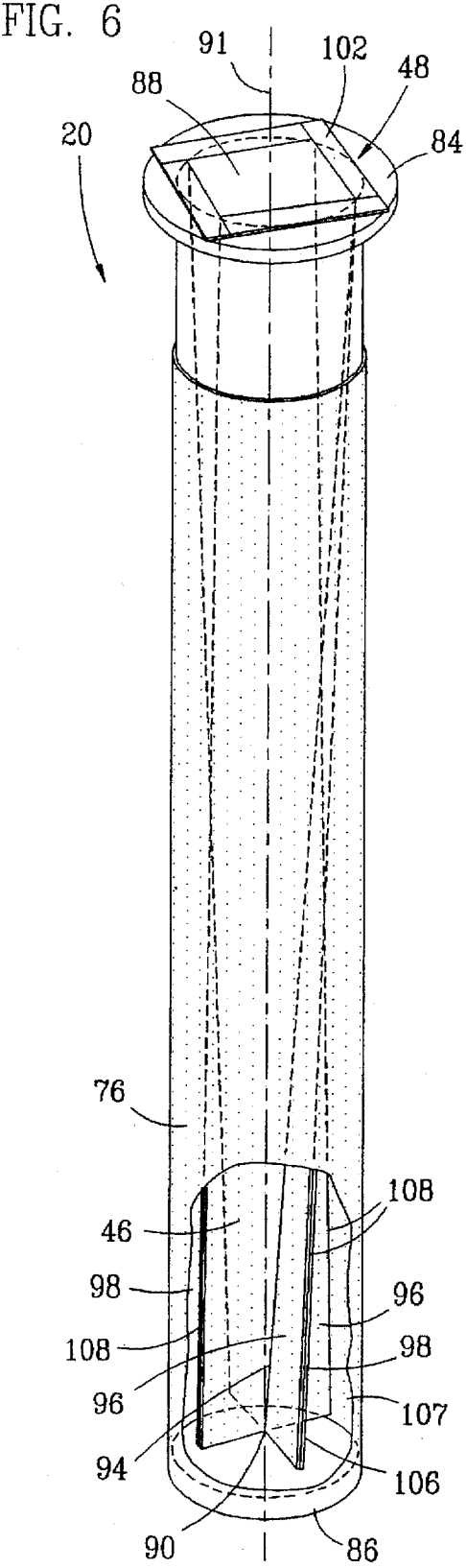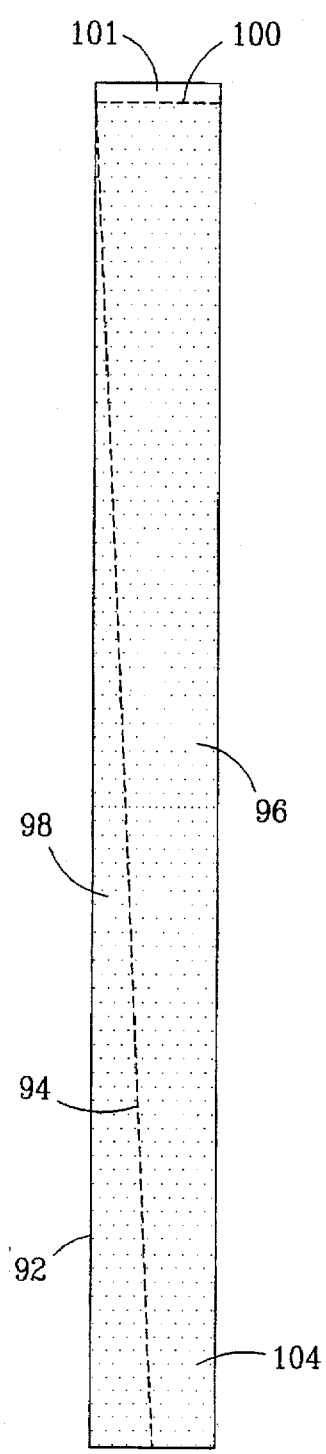

HIGH EFFICIENCY COMMERCIAL WATER HEATER

TECHNICAL FIELD OF THE INVENTION

The present invention relates to a high efficiency commercial water heater, and more particularly to a water heater having a radial flame burner surrounded by finned coils of water flow tubing by which heat is transferred to the water.

BACKGROUND OF THE INVENTION

For many years, commercial water heaters have been constructed using burners and heat exchanger water flow tubing. Commercial water heaters must be capable of producing and heating water with tens of thousands, and even hundreds of thousands, of BTUS. Further, in modern commercial applications, the emission standards for water heaters are becoming very strict. Complete burning of fuel is controlled so that hydrocarbon emissions are very low. In many existing commercial water heaters, natural gas is burned in an environment of forced air.

A general review of design factors and standard references to be considered in specifying commercial water heating systems is disclosed in "A Variety of Design Factors Govern Hot Water Heater Choices", CONSULTING/SPECIFYING ENGINEER, January 1991, pp. 48–51. Such factors include, by way of example, whether the system is to utilize direct or indirect heating, the anticipated load or demand, thermal efficiency, utilization temperatures, whether the system will be used in a condensing environment, water quality, corrosion, scale and the like.

Many direct fired, commercial water heating systems are presently available. One commercially available system, disclosed in U.S. Pat. No. 4,261,299, utilizes a horizontal combustion chamber around which water flows through a double-walled shell that is wound repeatedly around the combustion chamber with spaces between each successive winding to accommodate a countercurrent flow of exhaust gases.

Another commercially available system, disclosed in U.S. Pat. No. 4,938,204, utilizes a dual tank design. One tank contains the primary heat exchanger in which a horizontally mounted conventional burner heats water flowing through two-pass, U-bend firetubes. Exhaust gases that exit the primary heat exchanger at 350° F. to 400° F. are routed to a secondary heat exchanger where they are passed countercurrent to ambient makeup water to preheat the water before entering the primary exchanger. Makeup air is preheated to over 200° F. by passing it through ductwork which surrounds the exhaust gases exiting the secondary exchanger.

Some of the newer prior art systems utilize primary exchanger sections comprising a vertically disposed, radially directed, cylindrical burner in combination with a plurality of fixed length, copper-finned tubes arranged vertically around the burner. Water flows through the tubes, which are typically connected to headers located above and below the combustion zone, either in single or double-pass configurations. In some heaters, the copper-finned tubes are intermeshed and completely surround the burner to enhance heat transfer. Difficulties have been experienced with these heaters, however, because of the limited amount of expansion or contraction that can be accommodated with the fixed tube design, and also because any condensate that may form around the horizontal fins tend to pool up on the fins, leading to corrosion and/or scaling problems and diminished thermal efficiency.

More recently, a radial-fired water heating system has been introduced that utilizes horizontally disposed coils of self-baffling extruded copper tubing. Self-baffling tubing, with a generally hexagonal cross-section, is also believed likely to trap water and corrosive products on the outside of the tubing when used in a condensing environment. Most conventional designs employing coiled copper tubing use a stainless steel heat shield that is wrapped around the burner, preventing direct impingement heating on the coils. At least one design utilizes an inlet header disposed inside the circumference of the coils, making it difficult or impossible to inspect the water side of the heat exchanger section.

Another prior condensing water heater comprises a boiler section designed as a horizontal, double-row coil of finned copper tubing surrounding a cylindrical perforated-plate flameholder in combination with an economizer designed as a single coil of finned stainless steel tubing disposed radially outward from the primary coil.

Highly efficient transfer of heat energy from the burned fuel to the water has been an object of commercial water heater design for a number of years. In accomplishing the high efficiency heat transfer from the combustion products to the circulated water, a certain amount of water vapor in the combustion gases will be condensed from the combustion gas. The temperature becomes lower, indicating a more complete transfer of heat energy to the circulated water. Therefore, the higher heat transfer efficiency, particularly over about 85% to 90% efficiency, the more condensate which will form on the exterior of the heat exchanger coils. This condensate is typically highly acidic, having PH values in the range of between 2 to 5, depending upon the chemical constituents of halogenated hydrocarbon in the natural gas and air mixture. For example, increased halogen content of the natural gas and air mixture can greatly increase the acidity of the condensate.

Many commercial water heaters are simply designed to operate below the efficiency at which large quantities of condensate are likely to form so that the acidic vapors are discharged in vapor form in high temperature exhaust gas.

The corrosive nature of condensate in high efficiency water heaters has been addressed in various ways in various prior designs, including U.S. Pat. No. 5,311,843 in which horizontal tubing with vertical fins and vertical cylindrical spacers have been employed in order to permit the condensate to drain down by the force of gravity to a collector reservoir and drain outlet. Nevertheless, the presence of acidic condensate, even in small residual quantities, accelerates corrosion of the heat exchanger tubing, increasing oxidation and scale formation, reducing heat transfer efficiency and ultimately accelerating failure. Efforts were also made to facilitate easy access, removal and replacement of heat exchanger tubing. Separate tubing and removable intake and outlet manifolds have been designed in order to permit such access, inspection and replacement. Further, a plurality of separate, horizontally disposed circulation or heat exchanger tubes were advantageously used to permit the use of reduced water pressure, thereby extending the useful life of tubing even when it became subject to the corrosive effects of the condensate.

Some low temperature testing of polymeric coatings on copper heat exchanger tubing has been undertaken. It has not been proposed for high temperature radial direct-fired heat exchangers. It has previously been presumed that operating temperatures needed to be below about 200° F., or below the standard continuous use rating for most polymeric coatings. A need remained for corrosion prevention in high temperature direct radial-fired water heaters.

Notwithstanding the systems disclosed in the prior art, a radial-fired water heater apparatus is needed that is characterized by multiple-looped, continuous finned coils nested and having baffles to promote efficient heat transfer to water passing through the coils; corrosion-resistant surface treatment for the coil without sacrificing heat transfer efficiency; manufacturable radial flame defuser to facilitate uniform distribution of the radial heat energy to the coils and countercurrent flow of the exhaust products over the radial exterior coils to increase heat transfer efficiency.

SUMMARY OF THE INVENTION

A water heating apparatus is disclosed herein that provides efficient heat transfer, resists corrosion, operates at a condensing level of heat transfer efficiency and is durable and cost-effectively manufacturable. According to one embodiment of the invention, a water heating apparatus is provided that comprises a single, continuous, multi-looped finned coil water circulation tubing, having an exterior coil and a nested interior coil positioned to facilitate self-baffling. According to a particularly preferred embodiment, additional coiled, V-shaped baffles are interposed between adjacent loops of the exterior finned coils.

According to one aspect of the invention, the continuous counterflow circulation tube is constructed with large diameter finned copper tubing so that the pumping pressure required for treatment of large amounts of water and for transferring to the water more than about 25,000 BTU/hr. can be accomplished with water pressure and water-pumping pressure which is no greater than currently used in large commercial water heaters.

According to another aspect of the invention, both the inset and the outset of the continuous coil is at the bottom so that both drainage of the coils and ease of plumbing connections are simultaneously provided.

A further aspect of the invention is winding the heat exchange tubing in at least two radial layers, one nested in the trough formed by the other so that hot exhaust gases moving in a radial direction from the burner are forced around one set of coils in a turbulent pattern without using baffles disposed between the at least two layers of coils. Further, baffles are used in the exterior troughs of the outer layer of coils to force the exhaust gases to flow at least partially around the outside portion of each exterior coil.

According to yet another aspect of the invention, a unique inverted pyramid-shaped gas diffuser is provided, coaxially located with the radial coils and a centrally located cylindrical burner. The gas diffuser is uniquely constructed of perforated sheets of high temperature metal. The unique and cost-effective construction, according to the invention, allows four separate rectangular-shaped sheets of gas diffuser material to be bent at 90° along an angled break line. Each rectangular sheet is economically formed, identical to the others, so that the four sheets with the 90° breaks can be sealingly secured together along the length thereof, as by welding, resulting in an interior elongated pyramid. The interior pyramid is conveniently supported by four radially projecting double-layer secured areas extending along the length of the pyramid, which allows for convenient construction and assembly into the central area of the burner. Construction and handling costs are greatly reduced, yet the pressurized fuel and air mixture is diffused along the length of the burner. Thus, an even amount of fuel mixture is directed to the cylindrical burner and the flame jet at either end of the burner and therebetween is substantially the same so that the heat energy impinges upon the coils evenly along its length.

According to another aspect of the invention, the copper heat transfer finned tubing is coated with a protective polymeric material capable of withstanding operating temperature up to about 400° F. The polymeric coating, which is uniquely and advantageously used on the heat exchanger coils of a direct fired water heater, provides corrosion resistance which is particularly advantageous for water heaters operating in a condensing mode, as results during high efficiency operation. Particularly, an applied powdered epoxy has been found to be uniquely economically effective when uniformly deposited. Corrosion resistance is improved without significant loss of heat transfer capability.

According to another aspect of the invention, the high heat burner exhaust gases are directed first over interior loops and then over the exterior loops of the continuous coil heat exchanger. Also, the exhaust gases are evacuated at the bottom of the coils so that a counter-current flow of heated gases flows upward over the interior coils and then downward over the exterior coils. The cold water intake directs cold water first along the exterior or outermost coils so that the counterflow burner exhaust gases, having exchanged high temperature heat energy with the interior heat exchanger coils, continue to exchange lower-temperature heat energy to the lower-temperature exterior coils which carry the input cold water. Further, the output of the continuous coil heat exchanger from the interior coils where the burner temperature is the highest, so that the hottest water temperature in the coils is at the exit where heat transfer continues to result from a significant differential temperature between the hottest burner exhaust gases and the corresponding hottest water in the exit tubing.

According to a further aspect of the present invention, the fuel air mixing chamber is uniquely constructed for low-cost manufacturing while providing proper combustion ratio mixing. The pressurized air supply is at a greater pressure than the natural gas supply. According to this aspect of the invention, a fuel inlet tubing is inserted diametrically through and across the pressurized air duct. The fuel inlet tubing has appropriately sized orifices positioned on the downstream side of the diametrically interposed fuel tube so that a venturi effect results from the high pressure air around the tube to thereby draw natural gas fuel from a supply line at a pressure which is safely lower than the pressurized air flow. Compact construction is further provided by having the mixing chamber positioned horizontally, above the heat exchange coils, with a 90° elbow for vertically injecting the fuel/air mixture into the burner centrally located inside the vertically arranged coiled heat exchanger tubing, below. A uniform, radially directed burner flame facilitates heat transfer to the water circulation tubing arranged in coils around the radial flames of the burner. The water heater housing is closed at the bottom and around the coils, except for an exhaust outlet exterior to the burner and the coils near the bottom. Advantageously, rising, heated exhaust gases pass upwardly over the coils and once cooled by the coils, the gases also pass downwardly over the exterior of the coils toward the exhaust outlet.

According to yet a further aspect of the present invention, the continuous coiled heat exchanger tubing is held between a rigid upper plate and a lower support plate, with a plurality of rods or threaded fasteners extending vertically exterior to the coiled tubing, fastened between the upper and lower support plates to pull the lower support plate against the coils and toward the rigid upper plate. Refractory material is interposed between the upper plate and the coils, and a terminal end baffle is provided between the coils and the lower support plate. Rigid construction is advantageously and economically accomplished while permitting adequate thermal expansion and contraction, as may result in the burning chamber and the heat exchanger coils.

BRIEF DESCRIPTION OF THE DRAWINGS

These and other objects and advantages of the invention will be more fully understood with reference to the following detailed description, claims and drawings, in which drawings like numerals represent like elements and in which:

FIG. 6 is a schematic perspective view of one embodiment of a cylindrical-shaped, radial-tired burner with a partial cut-away view showing a pyramid-shaped gas diffuser and flame arrester assembly positioned therein according to one aspect of the present invention;

FIG. 7 is a side view of one of four identical rectangular sheets of high temperature, perforated flame diffuser material used to conveniently manufacture the pyramid-shaped gas diffuser, flame arrester of FIG. 6 according to the present invention;

DETAILED DESCRIPTION OF THE PREFERRED EMBODIMENTS

Figure 1:
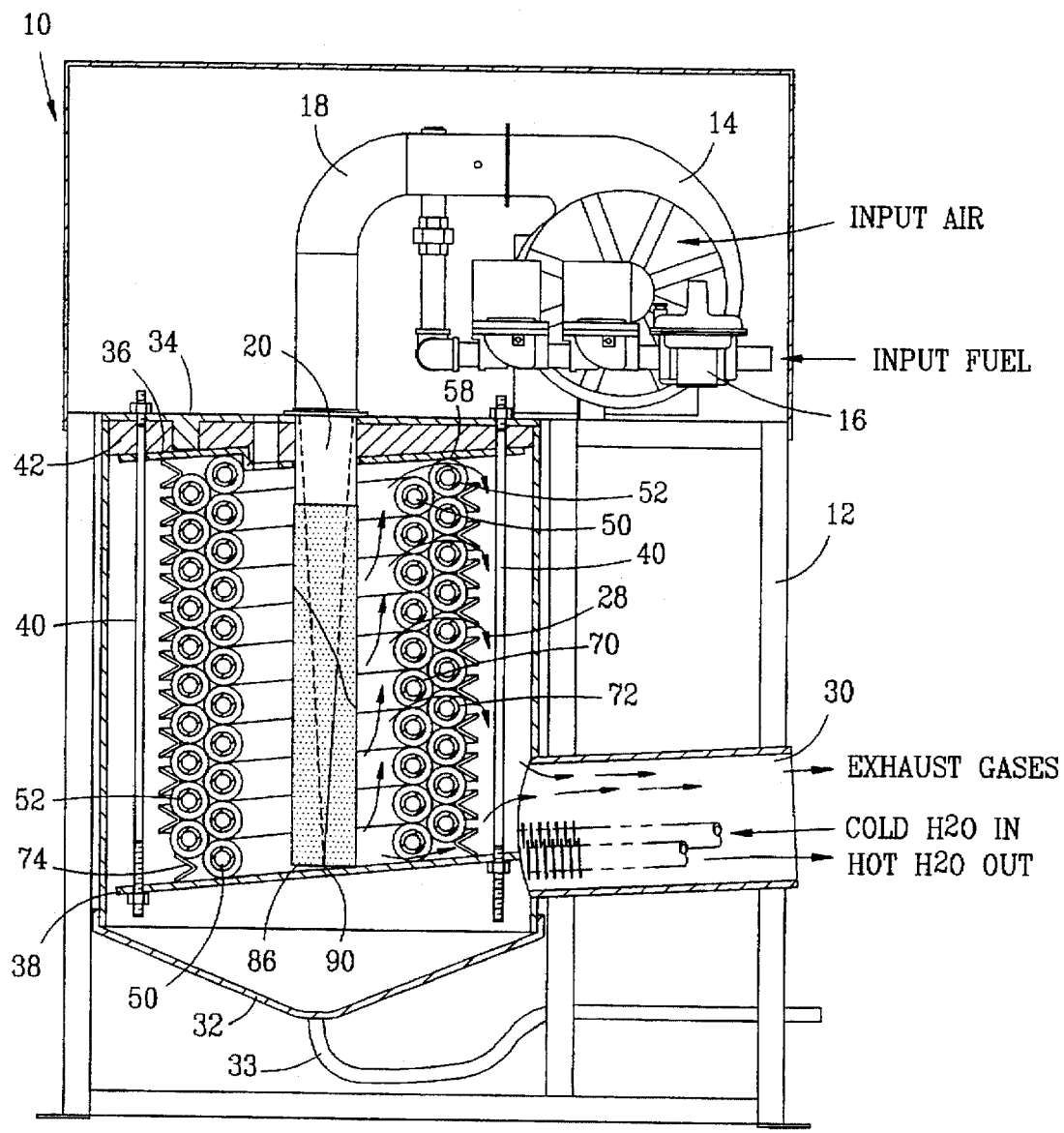
FIG. 1 is a schematic side elevation view, in partial cross-section, taken along a center line of cylindrical multi-looped, finned coil water circulation tubing of a radial-fired water heater, with an air blower regulator connected to an elbow-shaped mixing tube positioned above and feeding a radial-fired burner inside of the cylinder coils.
Figure 2:
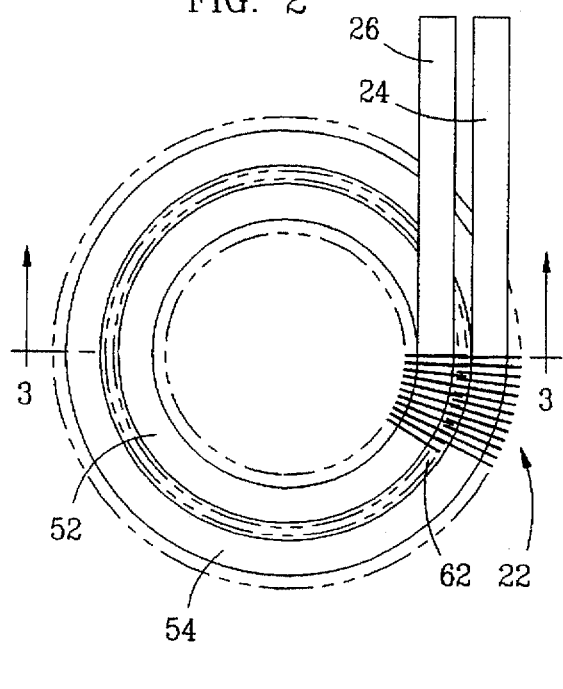
FIG. 2 is a schematic bottom plan view of a single, continuous, multi-looped, finned coil water circulation tube for use in the high efficiency water heater of FIG. 1, according to the present invention.

FIG. 1 shows a commercial water heater 10 in a schematic side elevation view with a partial cross-sectional view taken along a center line of cylindrical multi-looped, finned coil water circulation tubing 22, which is positioned around a cylindrical radial-tired burner 20. The commercial water heater 10 has a housing 12 in which air blower 14 is mounted for providing a high volume of compressed air. Regulated gas fuel 16 is also provided and mixed with the compressed air in the mixer tube 18. The mixer tube 18 provides the compressed gas and fuel mixture, preferably downward into the radial-fired burner 20, which provides a uniform radial flame therearound and interior to the heat exchanger tubing 22 (as shown in FIG. 2) which is arranged in an advantageous single coiled configuration, uniformly spaced from the surface of the cylindrical burner. An input 24 to the tubing 22 receives cold water, and the outlet 26 discharges the heated water for use or storage, as the case may be. Both the water input 24 and the water outlet 26 are advantageously located at the bottom of the heat exchanger coil 22, so that the entire heat exchanger coil can be drained of water when not being used. This is beneficial for purposes of maintenance and also avoids intermittent pockets of air and water, which can be disruptive and may potentially result in unwanted "hot spots" during start-up operation.

As will be discussed more fully below, the radial-fired burner is designed to provide uniform radial jets of flame, the tips of which jets of flame are adjacent to but spaced apart from the innermost portions of the heat exchanger coil 22. The heated gases from the flames flow, as schematically indicated, with flow lines 28 generally upward, primarily radially outward, but also with a component of upward flow due to heat expansion at the flames and then subsequently a downward flow after the heated exhaust gas exchanges its heat to the heat exchanger tubing 22 such that the exhaust gases move downward along the exterior of the heat exchanger tubing to exhaust gases 30 toward the lower end of the coils and radially outward therefrom extending through housing 12. Because of the completeness of the burning, the exhaust gases may be generally discharged with minimal impact on the environment, or, if additional purification is required by any particular governmental standards, may be further treated prior to discharge.

The industrial water heater, according to a preferred embodiment of the invention, operates in a condensing mode so that a desirable high thermal efficiency is obtained. Upon burning of the fuel and air mixture, $H_2O$ will be formed as a substantial constituent of the products of combustion. A significant portion of the heat of combustion is required to vaporize the water during the burning, including heat of vaporization. When all of the heat stored in the water is successfully transferred to the heat exchanger coils, condensate forms on the coils. The condensate drains toward the bottom by the force of gravity where it is collected in a condensate drain pan 32 and drained away through drain pipe 33 for appropriate treatment and discharge. A condensing mode of operation is typically associated with thermal efficiency of about 90–95%.

The burner unit 20 is supported downward from a rigid top plate 34, which is fastened to the housing 12. The coil 22 is advantageously supported between an upper support plate 36 and a lower support plate 38, having a plurality of connector rods 40, preferably four rods 40, equally spaced, extending from the rigid top plate through the upper support plate, past the exterior of the heat exchanger tubing and connecting at the lower support plate to pull the coils upward, sandwiched between the upper and lower support plates 36 and 38. A refractory material 42 is interposed between the upper support plate and the rigid top plate so that the top plate, which also supports air blower 14 and the gas fuel regulation mechanism 16, is maintained at significantly lower temperature than that found in the burner and heat exchanger tubing area.

The centrally located burner 20 has a cylindrical burner surface 50, which is preferably formed of a thin sheet of pressed high-temperature metal fibers having perforations 76 (shown in FIG. 6) uniformly therethrough so that the forced gas and air mixture delivered from the mixing tube 18 and heat exchanger tubing 22 is forced out of the perforations 76 through cylindrical burner surface 50 where it is ignited and burns to produce heat, which is transferred to the heat exchanger coils both by convection of the heated gases and also by radiation.

Figure 4:
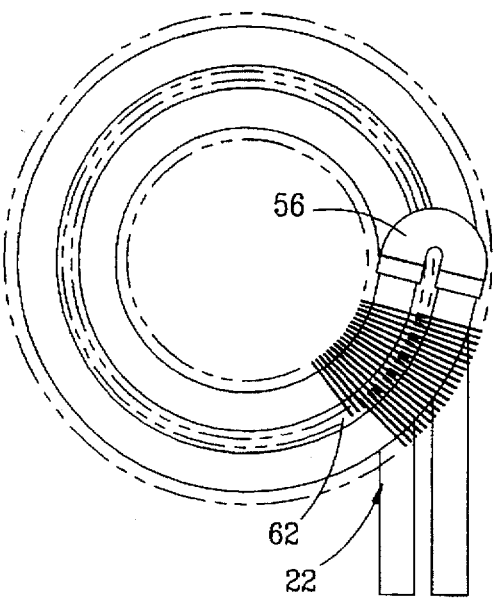
FIG. 4 is a schematic top view of the coil assembly of FIGS. 2 and 3 according to the present invention.
Figure 3:
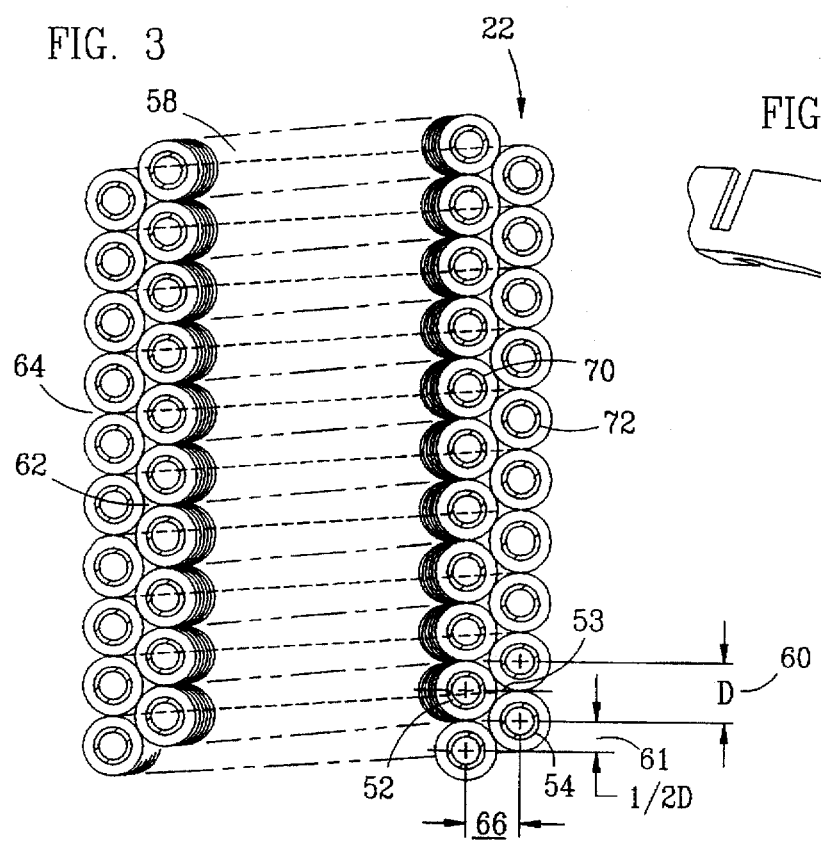
FIG. 3 is a schematic cross-sectional view taken along section lines 3—3 of the water heater coil of FIG. 2 according to the present invention.
Figure 5:
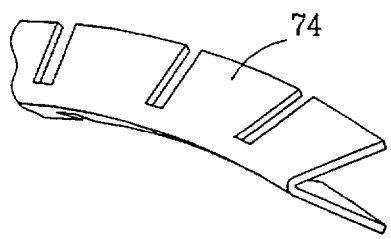
FIG. 5 is a partial schematic perspective view of a portion of a V-shaped baffle coil according to one aspect of the present invention.

With reference to FIGS. 2, 3 and 4, in which FIG. 2 is a schematic bottom plan view of the coil, FIG. 3 is a side cross-sectional view taken through a central axis of the coil and FIG. 4 is a top schematic plan view of the coils—the construction of the coils can be more fully understood. The coil 22 is advantageously formed of a single continuous tubing having a large interior diameter for carrying the water to be heated. The coil has an interior or "hot" coil 52 and an outer or "cool" coil 54. As shown in FIG. 2, the bottom of the exterior coil 54 terminates at the cold water inlet 24, and the bottom of the "hot" coil 52 terminates at the hot water discharge 26. Both coils are connected at the upper portion thereof by a "U" bend 56 (shown in FIG. 4) by which the water, having traversed the coil from entry 24 to top end 58, is redirected through "U" bend 56 back down through the interior coil 52 and out of exit discharge 26. The interior coil 52 and the exterior coil 54 are preferably wound with substantially even spacing 60, which is schematically represented as distance "D", which also in the preferred embodiment is substantially equal to the total outside diameter of the finned tubing. The centers of the outside tubing 54 and the inside finned tubing 52 are preferably offset in an axial direction along the coils a distance of about one-half D, as shown as 62. This allows the continuous tubing to be nested with itself, with the interior tubing portion 52 nested in the troughs 53 formed by the coiled exterior tubing portion 54 and the exterior tubing portion 54 nested in the troughs 62 formed by the coiled interior tubing portion 52 such that the radial distance 64 between the centers of the interior coil 52 and exterior coil 54 is less than the total outside diameter "D" of the tubing 22. One of the advantages of this arrangement is that the heated gases from the radial-fired burner must move around the exterior of the interior coil 52, and is then diverted around tubing 54 so that tubing 54 acts as a baffle or a diverter, causing the heated gases to move around the entire surface of the interior coil portion 52. With reference again to FIG. 1, the flow of heated gases, which is schematically depicted with dashed lines 28, indicating the flow of heated flue gas which flows around the radially distal surface 70 of interior coil 52. In order to facilitate the flow around the radially distal surface 72 of exterior coil 54, a baffle 74 is positioned in the trough 66 formed between adjacent loops of exterior coils 54. Preferably, baffle 74 is a continuous coil, having a V-shaped cross-section for a directing flow around the radially distal surfaces 72 of the coil 54. Thus, baffle 74 forms a substantially continuous baffle coiled around the entire coiled finned tubing heat exchanger. Advantageously, the baffle 74 with triangular cross-sectional shape is partially interposed between the coil and the upper support plate 36 at the top and also between the coil 22 and the lower support plate 38 at the bottom. Because of its shape and the modulus of elasticity of the metal from which the baffle 74 is constructed, it is partially resilient, yet deformable. Thus, it facilitates rigid support while allowing for heat contraction of the coil during cooling. The modulus of elasticity of a baffle 74 constructed of steel allows for expected thermal expansion and contraction without permanent deformation to the triangular cross-sectional shape of the baffle.

With reference to FIGS. 1, 6, 7 and 8, unique and advantageous features of a preferred embodiment of gas diffuser/flame arrester 48 will be more fully understood. The gas diffusing aspect of the invention allows for even pressure distribution of the fuel and air mixture 142 entirely along the openings 76 of burner 20, even though the gas and air mixture in mixing tube 18 is being propelled under pressure vertically downward through the center of the radial-fired burner 20. Without a diffuser, it has been found that because of the tendency of mass in motion to continue in motion, a larger pressure would result toward the distal end of the burner, causing burner flames to be uneven and, in most cases, larger at the distal end of the burner. As shown in FIGS. 1 and 6, the gas diffuser/arrester 48 of the preferred embodiment provides an inverted pyramid shape, having a smaller total surface area per unit of length toward its apex. Preferably, the perforations in the diffuser/arrester are uniformly sized and spaced such that there is a smaller number of openings at the distal end. The reduced opening area counteracts the typical pressure differential from one end of the burner to the other. The same amount of gas and air mixture moves through the larger number of openings at the proximal end, where the pressure is lower, as moves through the smaller number of openings 104 at the distal end, where the pressure is higher. The pressure between the diffuser and the burner is effectively equalized along the length of the burner.

Referring to FIGS. 6 and 7, the low cost, economical construction of the pyramid-shaped gas diffuser/arrester 48 may be more fully understood. FIG. 6 shows a schematic perspective view of the diffuser/arrester 48 inserted in the cylindrical burner 20. For purposes of clarity, the construction will be described in terms of its proximal end 84, which is shown in the preferred embodiment as the upper end 84 of the burner 20, and the distal end 86, which is shown in the figures as the lower end, with the radial-fired burner 20 positioned vertically. Advantageously, this construction not only diffuses the gas pressure evenly, but also the interposed diffuser acts as a flame arrester. If the flame ever "backfires" back upstream or burns through the burner, an increased pressure inside of the diffuser 48 will arrest, or retard, further flash back. The velocity of the fuel/air mixture through holes (perforations) of the diffuser is greater than the flame propagation speed. Also, the mass of the diffuser may act as a "heat sink", cooling and thus damping the flame. A pressure differential is maintained, using a small total opening area of the diffuser, preferably about a 30% open area, so that the flame is not likely to penetrate into the diffuser or to burn upstream into the mixer tube.

The pyramid-shaped diffuser/arrester 48 has a wide entry opening 88 positioned at the proximal end 84 and a closed apex 90 or at least a much smaller opening at the distal end 86. Preferably, the apex 90 is completely closed so that all the air and fuel mixture must exit radially from the diffuser. The pyramid-shaped diffuser/arrester 48 may be advantageously constructed using four flat blanks 92 of perforated material having an elongated, rectangular shape as shown in FIG. 7. Each blank 92 is then bent at 90° along break line 94. This provides one flat area 96, a portion of which will form one of the four sides of the pyramid-shaped diffuser, and another flat area 98 which will be used for fastening to another one of the four panels 92. The blank 92 is also subjected to a 90° break at line 100 to provide a portion 101 of a lip 102 around the proximal end of the diffuser for ease of construction in containing the assembly into burner cylinder 20. Each blank 92 preferably has numerous, uniformly spaced perforations or openings 104. It can be seen from the shape of the diffuser area 96 that the number of openings 104 per unit of length is greater at the proximal end than the number of openings per unit length at the distal end. It has been found that total opening area of about 30% will work well for purposes of diffusion and flame arresting.

With each of four blanks 92 bent and shaped, using only simple 90° bends, a diffuser/arrester 48 is constructed by fastening one side of the flat area 98 against the other side of flat area 96 of each adjacent one of the four blanks 92. The surfaces are preferably fastened so that they are sealed together, thereby reducing, and preferably eliminating, leakage along the seam 106 therebetween. Welding 107 or other secure fastening procedure may be used. Preferably, the apex 90 will be at a point along the central axis of the pyramid 46. Appropriately, bent blanks 92 form an apex, which is substantially completely closed by the intersection of the blanks 92 when they are fastened. The abutting portions fastened and sealed along each seam 106 will project radially outward a uniform distance forming four support edges 108 extending along the entire length of the diffuser so that the support edges 108 are conveniently provided for supporting the inverted pyramid-shaped diffuser 48 from the interior surface of cylindrical burner 20.

Figure 8:
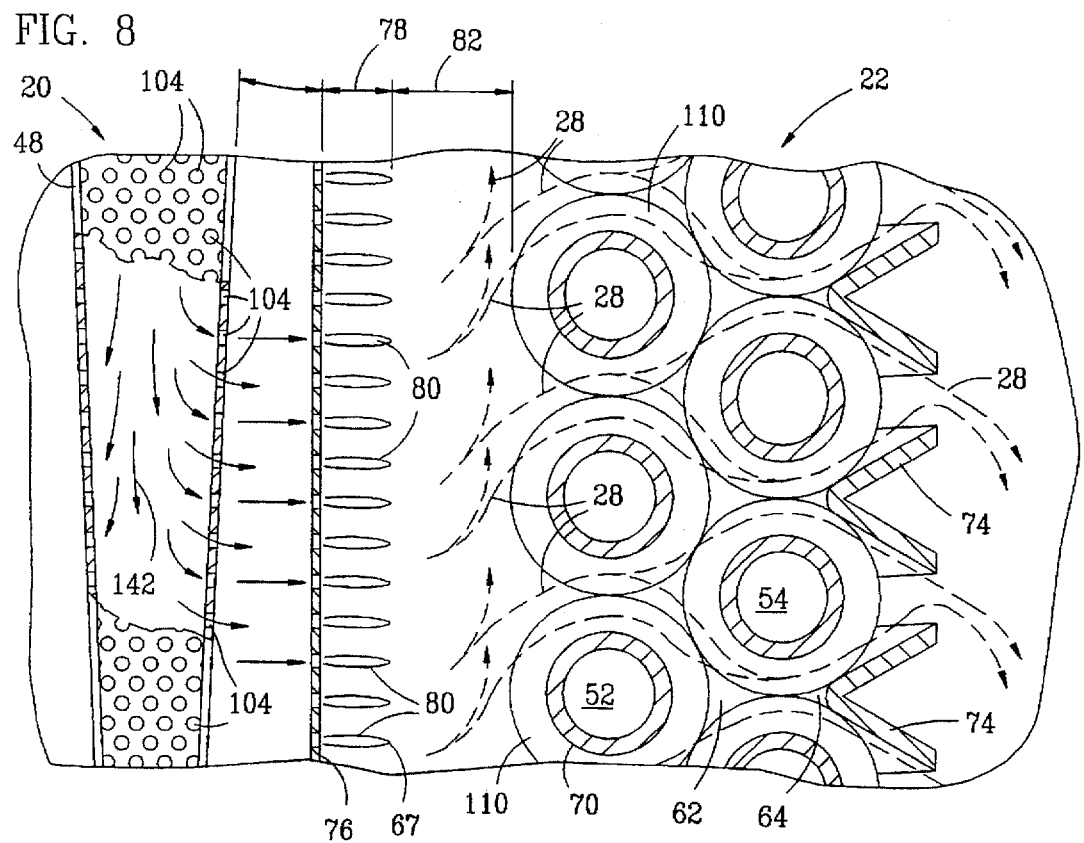
FIG. 8 is a partial schematic enlarged diagram of a direct radial-fired heater with gas diffuser and burner assembly inside of a continuous coil assembly with exterior baffles, depicting the flow of fuel and air mixture through the diffuser to the burner and depicting flames radially from the burner and further depicting the advantageous heat flow according to one embodiment of the present invention.

The number of burner openings around the cylindrical burner surface is substantially equal entirely along the length of the burner. Each opening receives substantially the same amount of fuel mixture at substantially the same pressure. The result, as schematically depicted in FIG. 8 is that the radial projection 67 of the flames 80 from the burner 20 are even entirely along the burner surface 76. Control of the pressure of the air and fuel mixture allows the flames to be adjusted so that a sufficiently large amount of heat is produced without direct flame contact with the flame 80 closely spaced from the fins 110 of the heat exchanger coils 22 without directly impinging upon the coils.

Figure 9:
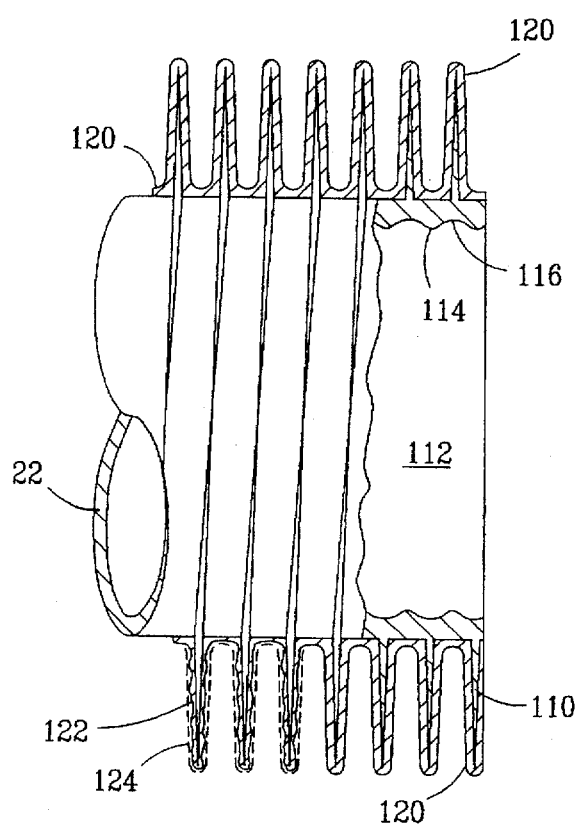
FIG. 9 is a partial schematic side view in partial cross-section schematically depicting enlarged details of a segment of extruded finned coil heat exchanger tubing and showing a polymeric coating deposited on the coil surface according to one aspect of the present invention.

FIG. 9 is a schematic partial cutaway, detailed drawing, showing certain advantageous features of the fins, according to the preferred embodiment. One of the features of the coiled, finned design, which is particularly advantageous in the present invention, includes the large diameter interior construction of copper tubing. Also, the large diameter allows adequate water flow through the entire length of continuous coil, even at normally used water pressures for much shorter lengths of tubing. Not only is the heat conductivity of copper especially advantageous for heat transfer purposes, but also, the preferred construction includes a copper tubing having the fins integrally formed therealong. The fins 110 are formed through a rolling and extrusion process, which forces the malleable copper into fin shapes, but which also naturally results in an interior surface 112 which has rises 114 and valleys 116 which facilitate turbulent water circulation flow through the tubing. The turbulence causes increased heat transfer characteristics and reduce scale buildup within the interior of the large diameter tubing. A tubing having an inside diameter of about 1½ inches allows a total length of continuous coil tubing 22 of more than about 50 feet, up to approximately 100 feet, to be operated at pressures no greater than those which are normally found in the industry for water circulation through commercial heat exchanger tubing. For example, in one preferred embodiment, approximately 80 feet of continuous finned copper tubing with 1½ inches inside diameter is useful for a machine operating at about 1 million BTU/hr. Maintaining the low pressure drop while providing enhanced heat transfer permits construction of commercial water heaters with copper heat exchanger tubing, using normal manufacturing processes and normal thickness copper tubing to maintain materials cost.

Particularly advantageous for purposes of operating the water heater in a high efficiency condensing mode of operation, the fins are protected with a polymeric coating. Those skilled in the art will understand that when the exhaust gas (flue gas) temperature drops below the condensation temperature of water vapor, condensate forms on the heat exchanger coils. Thus, to achieve highly efficient heat transfer, the latent heat of vaporization is transferred from the burner gases to the coils and to the water carried therein. The thermal efficiency of the unit thereby increases to about 90–95% thermal efficiency, because the latent heat of vaporization is recovered from the flue gases rather than merely being exhausted in the form of vapor. Fuel economy is improved. Previously, the use of copper tubing for purposes of condensing or high efficiency operation has not been acceptable because the acidity of the distillate of natural gas burned in air is normally about a pH level of 3–4. Environments in which the small constituents of chlorine or fluorine are in the gas, such as with fluorohydrocarbons or other refrigerants, can increase the amount of acidity in the condensate to a pH level of 2, or less, due to the formation of halosenic acids in the combustion process, which are then concentrated in the flue gas condensate.

While previously high quality stainless steel heat exchanger coils were required for a high efficiency condensing operation, the present invention uniquely adapts a polymeric coating 120 for use on copper tubing 22 in a direct-fired radial commercial water heater. In one embodiment of the invention, the polymeric coating 120 consists of an epoxy coating 120, which is between about 1 and 6 mils thick, evenly deposited over the entire exterior surface of the heat exchanger tubing 22 in the area of gas-fired heating. It has been found that by using a process by which a powdered epoxy is electrostatically deposited on the coils and then cured at temperatures up to about 400° F., an epoxy coating can be provided which will withstand the operating conditions of a radially direct-fired water heater according to the present invention. In the preferred embodiment, the deposition of powdered epoxy, using electrostatic processes, is facilitated by providing an initial or first layer 122 and then by a subsequent layer 124 or multiple subsequent deposit layers 124. The subsequent deposit layers 124, because of their electrostatic nature, tend to fill any voids left initially so that a substantially continuous and even thickness layer of cured epoxy is provided, which is from 2 to 6 mils thick. A particularly advantageous epoxy is one which has a black color to further facilitate radiant heat transfer. One such epoxy is available from O'Brien Powder Products, of Houston, Tex., identified as a modified epoxy under a product name of "PAC BLACK" and Product Number EFB-408-53. The ingredients include epoxy resin, a small percentage of carbon black and nuisance dust.

It has further been found that because the burner flame of a heater, according to the present invention is maintained at an even height along the entire burner and can be adjusted so that no part of the flame directly impinges upon the surface of the heat exchanger coil, and further because the heat transfer characteristics of the copper are so good, the temperature of the epoxy is maintained below an acceptable operating temperature, up to about 400° F., even though the gases from the burner are at much higher temperatures. It has been discovered that because the layer of epoxy is thin, and because of the dark color, the heat transfer characteristics of a coated tubing are acceptably close to being the same as those for an uncoated tubing. It is theorized that any reduction of conduction through the epoxy layer and its interface with the copper is, to some extent at least, offset by the increased radiant absorption of the dark color as opposed to the metallic copper and therefore is not substantially different from a copper tubing with normal oxidation as might be found in other heat exchangers. The uniqueness of this application is, in part, that its use in a direct-fired heat exchanger in areas where the gas flame temperature may be as high as 2,000° F., substantially above the acceptable range for continuous operation of most polymeric coatings. Application of the polymeric coating directly to the copper finned tubing according to the present invention, nevertheless, has been found to work well to protect the metal, even in a condensing mode of operation.

It has been discovered that the use of epoxy can be made in this high temperature environment, and other polymeric coatings previously thought only to be acceptable in a much lower temperature copper tubing coating operations have also been found to be useful in connection with a direct-fired heat exchanger according to the present invention. Particularly, integral finned copper tubing having a coating of polyphenylene sulfide (PPS) will also be useful with thicknesses of 2.5 to 5.0 mils. Such a coating, however, to be effectively applied, would currently need be cured in an inert atmosphere, because curing will require temperatures of up to about 800° F., at which oxidation of the uncoated copper during curing would be unacceptable. Therefore, under current procedures, the use of PPS coatings 120 would be more expensive than that through the use of an epoxy coating 120, as set forth in the preferred embodiment. It has also been found that some of the advantages of the polymeric coating with either epoxy or PPS can also be obtained with a polymeric coating in which the polymer is a baked phenolic coating. It is believed that baked phenolic would operate similar to the epoxy coating because of the rapid heat transfer through the copper tubing, but might not operate as well for corrosion resistance under the acidic conditions associated with the condensate which will form on the copper tubing from the continuous coiled heat exchanger during high efficiency operation.

Because of the discovery that polymeric coatings can be used in the high temperature environment of direct radial-fired commercial heat exchangers using copper tubing, other organic coatings may also be found which can be used in this purpose without departing substantially from some aspects of Applicants' invention.

Figure 10:
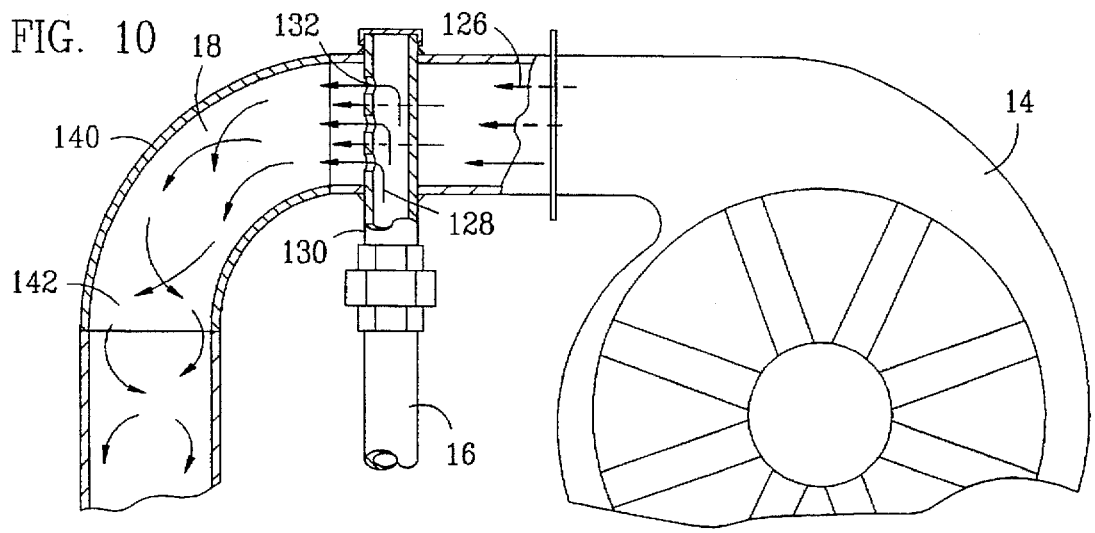
FIG. 10 is a partial side view in partial cross-section along a central plane of a mixer tube according to one aspect of the present invention.

Turning now to FIG. 10, which is a partial cross-sectional side view of the mixing tube and low pressure gas jet, a convenient, easily manufacturable construction, according to the present invention, and the advantages thereof will be more fully understood. Advantageously, for purposes of a compact construction with the blower 14 mounted above the burner 20, and also to facilitate increased mixing of the air 126 from blower 14, with the gaseous fuel or natural gas 128, a 90° elbow 140 is provided. The air at 126 from blower 14 is typically at a pressure of about 3–6 inches of water, and the gas is at a lower pressure. However, as the air 126 passes over the gas inlet tubing 130, a venturi type effect decreases the pressure behind the tubing, downstream from the gas inlet jet tubing 130, as at 132, so that low pressure natural gas 128 is drawn into the mixing tube 18 and, upon impinging upon the bend of elbow 140, is turbulently mixed with the air 128 to form a fuel/air mixture 142 which enters the burner 20 in a substantially vertical direction for input to the radial burner 20 through diffuser 48, as discussed above.

Figure 11:
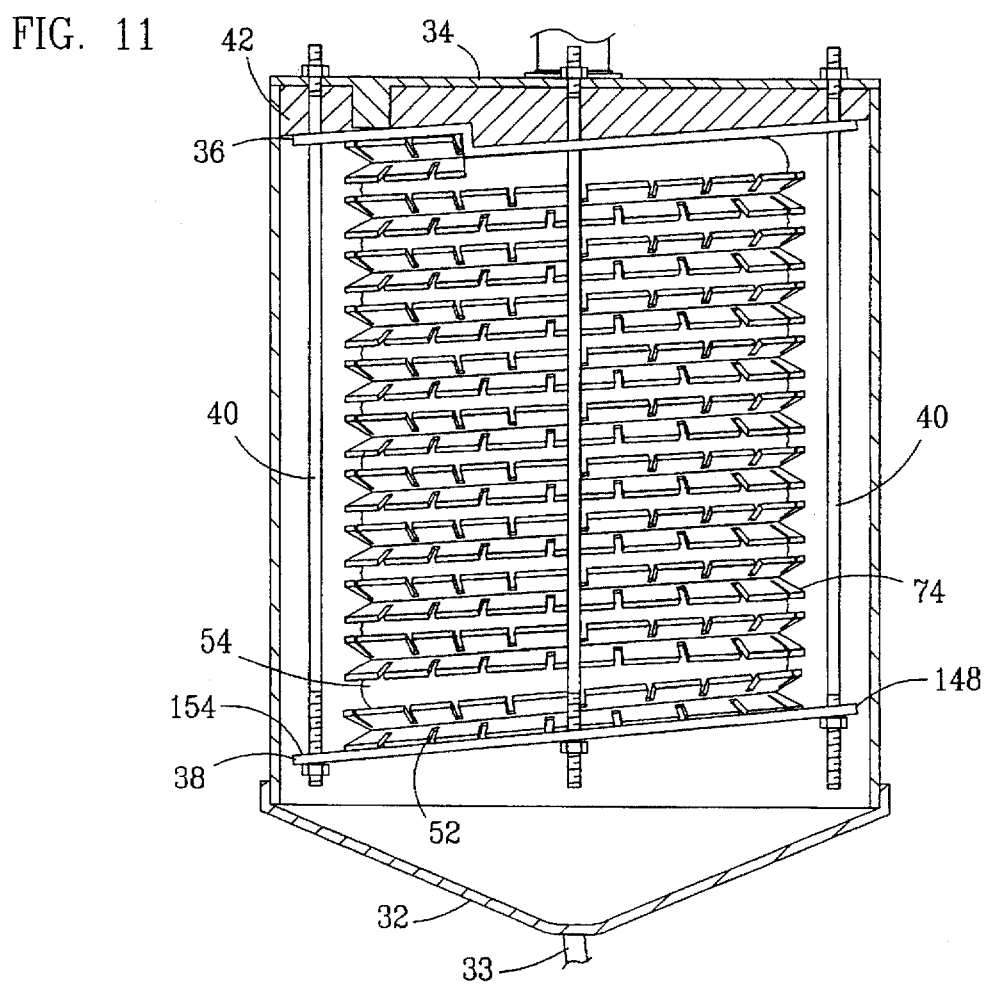
FIG. 11 is a schematic side view of a coil assembly in a housing (shown in cross-section) supported by upper and lower support plates which also seal the ends, according to one aspect of the present invention.
Figure 12:
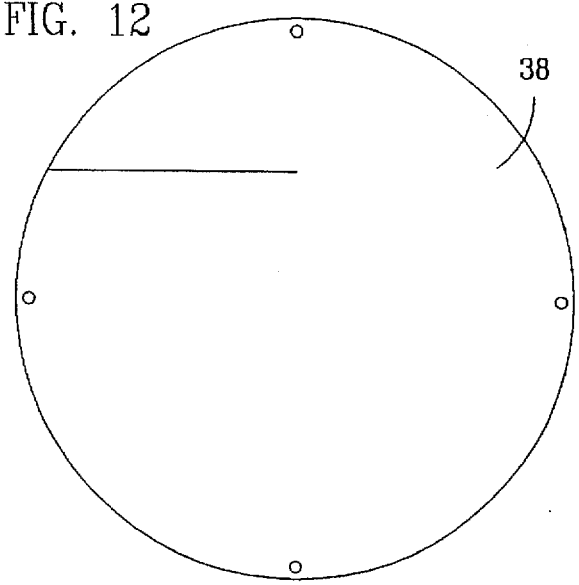
FIG. 12 is a bottom view of a lower coil support and plate according to one aspect of the present invention.
Figure 13:
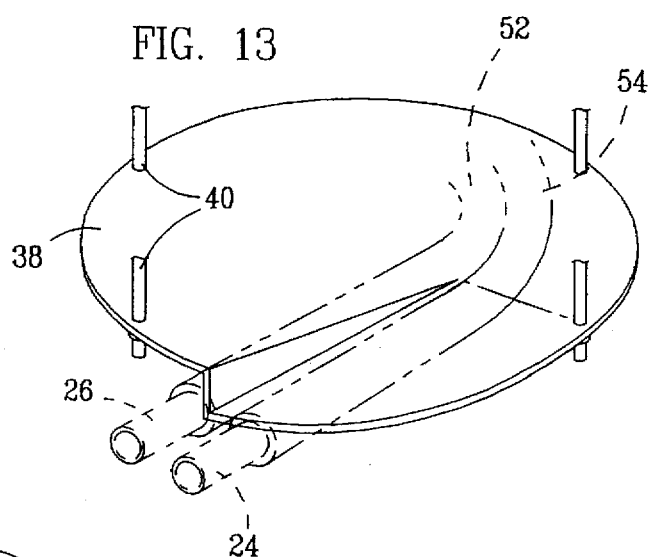
FIG. 13 is a schematic perspective view of the lower coil support and plate of FIG. 12 with a portion of a continuous heat exchanger coil, depicted in phantom lines, positioned on the lower coil support and seal plate of FIG. 12 according to the present invention.
Figure 14:
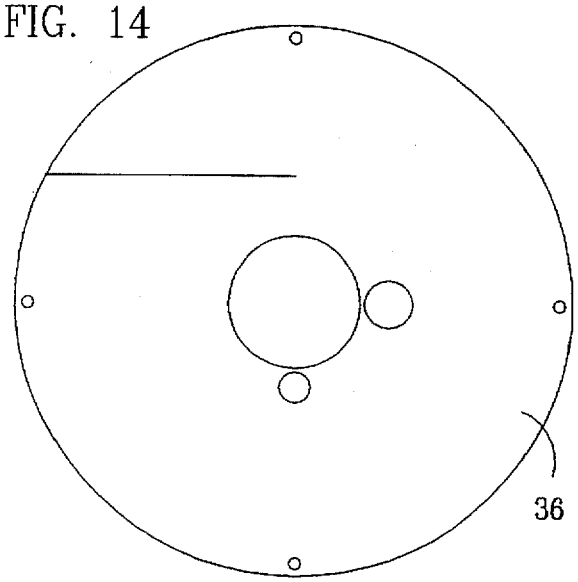
FIG. 14 is a top view of an upper coil seal plate according to one aspect of the present invention.

Another advantageous feature of the invention is the rigid connection of the continuous heat exchanger coil tubing and the unique construction which provides for such rigid connection without harmful effects from heating expansion and cooling contraction. This feature can be more fully understood with reference to FIGS. 11, 12, 13 and 14, taken together, in which FIG. 11 is a schematic side view of the rigid coil attachment, FIG. 12 is a top plan view of a bottom coil support plate, FIG. 13 is a partial schematic perspective view showing the lower inner and outer coil portions 52 and 54, as they interface with the lower support plate 38, and FIG. 14 is a bottom plan view of a top support plate between which the heat exchanger coils are rigidly sandwiched. The entire coil is, therefore, sandwiched between connector support rods 40, which are advantageously threadably tightened to pull the bottom support plate 38 toward the top support plate 36, both of which are mounted to a rigid base plate 34 of housing 12. Interposed in multiple layers between the upper surface of the coils and the top support plate 36 is a high temperature refractory material, preferably deformable refractory material, to further accommodate expansion and contraction. Also, interposed above the support plate are connector brackets 144, 145, 146 and 150, each of which is constructed with a different length to accommodate the angle at which the top of the coils will rest against the top support plate 36. The space between the top support plate is further filled with additional refractory or insulating material 152 so that the high temperature of the burner is not directly conducted to the airblower 14 and gas regulators 16 positioned above the burner. It will further be understood with reference to FIG. 11, that condensate which forms on the coils during operation merely flows by gravity off of the edge 154 of lower support plate 38 and is collected in a drainpan 32 where it is conducted through a drainpipe 33 to the outside of the housing 12 for appropriate processing or for disposal in an environmentally safe manner.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A water heater apparatus comprising:

(a) a housing;

(b) a radial-fired burner within said housing;

(c) a single continuous, multiple loop, finned coil tubing heat exchanger, having inlet and outlet tubing for circulating water around said burner and having at least a first set of inner coils forming a coil trough therebetween and a second set of outer coils nested within said coil trough formed by said inner set of coils, said coils forming a second coil trough around the exterior thereof wherein said single continuous, multiple loop, finned coil tubing is positioned vertically about a central axis so that the inlet and the outlet of the single continuous, multiple loop, finned coil tubing heat exchanger is positioned at the bottom of the inner and outer coils, with said inlet connected at the bottom to the outer coils and the outlet connected at the bottom to the inner coils and having a "U" connector at the top, so that water flows up around the outer coils and is returned in counter flow, with the "U" connector flowing down to the inner coils and out through the outlet, so that the exiting water is closest to the radial-fired burner and the water exits at a maximum temperature; and (d) a coil baffle interposed in said second exterior trough for deflecting heat adjacent to said second set of coils.

2. A water heater apparatus comprising:

(a) a housing;

(b) a radial-fired burner within said housing;

(c) a single continuous, multiple loop, finned coil tubing heat exchanger, having inlet and outlet tubing for circulating water around said burner and having at least a first set of inner coils forming a coil trough therebetween and a second set of outer coils nested within said coil trough formed by said inner set of coils, said coils forming a second coil trough around the exterior thereof;

(d) a coil baffle interposed in said second exterior trough for deflecting heat adjacent to said second set of coils; and (e) wherein said radial-fired burner comprises a cylindrical burner positioned coaxially with the single continuous, multiple loop, finned coil tubing, having a plurality of perforations therein and a pyramid-shaped diffuser centrally located within said cylindrical burner, having an inlet to the diffuser with a large cross-sectional area, with a progressively smaller cross-sectional area toward the apex of the pyramid-shaped diffuser, which apex is substantially coterminous with said cylindrical burner, and having perforations in said diffuser substantially uniformly sized and spaced, so that the fuel and air pressure gradient is counteracted to equalize pressure along the length of the burner and uniform times result entirely along the burner surface.

3. A water heater apparatus, as in claim 2, further comprising a polymeric coating applied to said single continuous, multiple loop, finned coil tubing heat exchanger, so that the corrosive effects of condensate are reduced and operation of the water heater apparatus at high efficiencies resulting in condensing mode of operation can be accomplished with reduced wear and maintenance.

4. A water heater apparatus comprising:

(a) a housing;

(b) a radial-fired burner within said housing;

(c) a single continuous, multiple loop, finned coil tubing heat exchanger, having inlet and outlet tubing for circulating water around said burner and having at least a first set of inner coils forming a coil trough therebetween and a second set of outer coils nested within said coil trough formed by said inner set of coils, said coils forming a second coil trough around the exterior thereof;

(d) a coil baffle interposed in said second exterior trough for deflecting heat adjacent to said second set of coils;

(e) a rigid plate fastened to said housing above said radial-fired burner and said heat exchanger tubing;

(f) a bottom support plate positioned below said heat exchanger coils, having a shape approximating a spiral ramp corresponding to the shape of the bottom of the heat exchanger coils;

(g) inlet and outlet tubing; and (h) a plurality of fastener rods extending from said rigid top plate to said support plate for securely fastening said bottom support plate to said top plate, with said heat exchanger coil tubing sandwiched therebetween.

5. A water heater apparatus comprising:

(a) a housing;

(b) a radial-fired burner within said housing;

(c) a single continuous, multiple loop, finned coil tubing heat exchanger, having inlet and outlet tubing for circulating water around said burner and having at least a first set of inner coils forming a coil trough therebetween and a second set of outer coils nested within said coil trough formed by said inner set of coils, said coils forming a second coil trough around the exterior thereof;

(d) a coil baffle interposed in said second exterior trough for deflecting heat adjacent to said second set of coils;

(e) a fuel and air mixing tube;

(f) a pressurized air source connected to said mixing tube;

(g) a pressurized fuel source connected to said mixing tube;

(h) an elbow, with about a 90° bend, between said mixing tube and said radial-fired burner, by which said air/fuel mixture can be directed into said radial-fired burner, with a compact structure for said water heater; and (i) wherein said mixing tube further comprises a fuel jet tube extended diametrically through said mixing tube downstream from said pressurized air source, said fuel jet tube having a cylindrical shape and diameter smaller than said mixing tube and having a plurality of fuel outlet orifices on a downstream side of said fuel jet tube, so that the venturi effect of the pressurized air flowing over the fuel jet tube causes fuel to be drawn into the airstream from a fuel pressure source which is a lower pressure than said pressurized air source.

6. A diffuser construction for use inside of a cylindrical-shaped radial-fired burner for a water heater, comprising:

(a) a proximal entrance end having an opening with a predetermined cross-sectional area into which a pressurized mixture of fuel and air is injected in an axial direction;

(b) a distal end smaller in cross-section than said opening of said proximal entrance end coterminous with said cylindrical burner; and (c) tapered side walls having a multiplicity of uniformly sized and spaced orifices formed therein, so that the total opening area decreases toward the distal end of said tapered side walls and through which said injected mixture of fuel and air is diffused to said radial-fired burner at substantially equal pressure along the entire length thereof.

7. A diffuser construction, as in claim 6, wherein said diffuser construction defines a pyramid shape, with its base at the proximal entrance and its apex at the distal end.

8. A diffuser construction, as in claim 7, wherein said pyramid shape comprises four rectangular blanks of perforated material, each bent at 90° along an angled break line, which break line bisects each rectangular blank into first and second truncated triangular-shaped panels such that the first truncated triangular-shaped panel is at 90° to the second truncated triangular-shaped panel along said break line, so that each of said four blanks is securely attached with said triangular-shaped panel of one blank attached to a second truncated triangular-shaped panel of another rectangular blank at four corners of said pyramid shape, so that a pyramid shape and diffuser is formed having four radially-projecting webs by which said four-sided pyramid-shaped diffuser can be supported within said cylindrical-shaped burner coaxially therewith.

9. A diffuser construction, as in claim 6, wherein said cylindrical-shaped burner is formed of a perforated sheet of high temperature pressed metal fibers formed into a cylindrical shape having a size for receiving said diffuser.

10. A water heating apparatus, comprising:
  (a) a housing having a rigid top plate;
  (b) a vertical radial-fired burner extending vertically downward through said top plate heat exchanger coils;
  (c) heat exchanger coils positioned around said vertical burner;
  (d) a bottom support plate positioned below said burner and coil;
  (e) connector rods extending between counter rigid top plate and said bottom support plate, having adjustable lengths for accommodating an angle of terminal coils and for adjustably tightening said coils between said top plate and counter bottom support plate.

11. A water heating apparatus, as in claim 10, further comprising:
  (a) a continuous, helical coiled heat exchanger formed with a straight section of said heat exchanger tubing, extending tangentially from one end of said coil; and
  (b) wherein said bottom support plate has a partial helical shape formed with a vertical, triangular webbed section to accommodate said helical coil shape, and said tangentially extending tubing section.

12. A water heating apparatus, as in claim 11, further comprising a partially helical shape corresponding to the helical angle of said continuous coil heat exchanger, with said connector rods extending from said rigid top plate through said top support plate and along said heat exchanger coil to said bottom support plate so that said coil is securely sandwiched between said bottom support plate and said top support plate.

13. A water heating apparatus, as in claim 11, further comprising a helical-shaped external baffle having a triangular cross-sectional shape so that it is bendable in a radial direction and interposed partially between bottom end of said coil tubing and said bottom plate, so that heating expansion and cooling contraction can be accommodated through elastic deformation of said baffle.

14. A water heating apparatus, as in claim 10, wherein said connectors comprise threaded rods with threaded nuts adjustable threadable for securing fastening said bottom support plate against said helical coils.

15. A water heating apparatus, as in claim 10, further comprising a refractory insulation material interposed between said helical coils and said top plate for thermal insulation.

* * * * *

UNITED STATES PATENT AND TRADEMARK OFFICE
CERTIFICATE OF CORRECTION

PATENT NO. : 5,687,678
DATED : November 18, 1997
INVENTOR(S) : Frank H. Suchomel et al It is certified that error appears in the above-indentified patent and that said Letters Patent is hereby corrected as shown below:

Column 1, Line 62
    Replace: "tins"
    With: --fins--

Column 3, Line 6
    Replace: "25,000"
    With: --250,000--

Column 4, Line 47
    Replace: "radially directed"
    With: --radially-directed--

Column 5, Line 10
    Insert after 'blower': --and fuel--

Column 5, Line 26
    Replace: "radial-tired"
    With: --radial-fired--

Column 6, Line 11
    Delete: "(as shown in Fig. 2)"

Column 6, Line 14
    Insert after '22': --(as shown in Fig. 2)--

UNITED STATES PATENT AND TRADEMARK OFFICE
CERTIFICATE OF CORRECTION

PATENT NO. : 5,687,678

DATED : November 18, 1997

INVENTOR(S) : Frank H. Suchomel et al

It is certified that error appears in the above-indentified patent and that said Letters Patent is hereby corrected as shown below:

Column 9, Line 39
    Replace: "tins"
    With: --fins--

Column 9, Line 53
    Replace: "tins"
    With: --fins--

Column 9, Line 60
    Replace: "1 1/2"
    With: --1 1/4--

Column 9, Line 67
    Replace: "1 1/2"
    With: --1 1/4--

Column 10, Line 54
    Delete 'after Products': ","

Column 10, Line 60
    Insert after 'invention': --,--

UNITED STATES PATENT AND TRADEMARK OFFICE
CERTIFICATE OF CORRECTION

PATENT NO. : 5,687,678

DATED : November 18, 1997

INVENTOR(S) : Frank H. Suchomel et al

It is certified that error appears in the above-indentified patent and that said Letters Patent is hereby corrected as shown below:

Claim 2, Column 13, Line 33
    Replace:    "times"
    With:     --flames--

Signed and Sealed this

Fourth Day of August, 1998

Attest:

BRUCE LEHMAN

*Attesting Officer*      *Commissioner of Patents and Trademarks*